US008199757B2

(12) United States Patent
Pani et al.

(10) Patent No.: US 8,199,757 B2
(45) Date of Patent: Jun. 12, 2012

(54) METHOD AND APPARATUS FOR LAYER 2 PROCESSING AND CREATION OF PROTOCOL DATA UNITS FOR WIRELESS COMMUNICATIONS

(75) Inventors: Diana Pani, Montreal (CA); Paul Marinier, Brossard (CA); Christopher R. Cave, Verdun (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 242 days.

(21) Appl. No.: 12/238,738

(22) Filed: Sep. 26, 2008

(65) Prior Publication Data

US 2009/0086659 A1 Apr. 2, 2009

Related U.S. Application Data

(60) Provisional application No. 60/976,057, filed on Sep. 28, 2007.

(51) Int. Cl.
*H04J 3/16* (2006.01)
*H04J 3/22* (2006.01)
*H04J 3/00* (2006.01)

(52) U.S. Cl. ........ 370/394; 370/466; 370/470; 370/473; 370/474

(58) Field of Classification Search .................. None
See application file for complete search history.

(56) References Cited

U.S. PATENT DOCUMENTS

| 6,574,224 | B1 * | 6/2003 | Brueckheimer et al. ... 370/395.6 |
| 7,321,589 | B2 * | 1/2008 | Lohr et al. .................... 370/394 |
| 2005/0089004 | A1 * | 4/2005 | Casaccia et al. ............. 370/347 |
| 2006/0007886 | A1 * | 1/2006 | Lee et al. ..................... 370/329 |
| 2008/0069043 | A1 * | 3/2008 | Kimura et al. ............... 370/329 |
| 2008/0089285 | A1 * | 4/2008 | Pirskanen et al. ........... 370/329 |

FOREIGN PATENT DOCUMENTS

EP 1764980 A1 9/2005

OTHER PUBLICATIONS

Third Generation Partnership Project, "Technical Specification Group Radio Access Network; UTRAN Lub/Lur Interface User Plane Protocol for DCH Data Streams (Release 7)", 3GPP TS 25.427 V7.5.0, (Sep. 2007).

(Continued)

*Primary Examiner* — Xavier Szewai Wong
(74) *Attorney, Agent, or Firm* — Condo Roccia LLP

(57) ABSTRACT

Enhanced MAC-es PDUs are created by concatenating enhanced MAC-es service data units (SDUs) based on higher layer PDUs and segments thereof, where segmentation information is included in the enhanced MAC-es headers. An enhanced MAC-e header is generated for each enhanced MAC-es PDU to describe information about the enhanced MAC-es PDU. An enhanced MAC-e PDU is created by concatenating enhanced MAC-es PDUs and enhanced MAC-e headers. An enhanced MAC-es header may include a Transmit Sequence Number (TSN) field, a Segmentation Description (SD) field, length (L) fields to indicate the length of each enhanced MAC-es SDU and/or logical channel indicator (LCH-ID) fields. An enhanced MAC-e header may include one or more logical channel indicator (LCH-ID) fields for corresponding enhanced MAC-es PDUs or MAC-s SDUs and length (L) fields. Various techniques are disclosed for indicating the end of the enhanced MAC-e header. In another embodiment, methods for signaling over the Iub frame protocol are proposed to support MAC segmentation and flexible RLC PDU sizes.

36 Claims, 5 Drawing Sheets

OTHER PUBLICATIONS

Third Generation Partnership Project, "Technical Specification Group Radio Access Network; UTRAN Lub/Lur Interface User Plane Protocol for DCH Data Streams (Release 8)", 3GPP TS 25.427 V8.0.0, (Mar. 2008).

Third Generation Partnership Project, "Technical Specification Group Radio Access Network; HSPA Evolution (FDD); (Release 7)", 3GPP TR 25.999 V2.1.0, (May 2007).

Third Generation Partnership Project, "Technical Specification Group Radio Access Network; HSPA Evolution (FDD); (Release 7)", 3GPP TR 25.999 V2.3.0, (Sep. 2007).

Third Generation Partnership Project, "Technical Specification Group Radio Access Network; High Speed Packet Access (HSPA) Evolution; Frequency Division Duplex (FDD) (Release 7)", 3GPP TR 25.999 V7.1.0, (Mar. 2008).

Third Generation Partnership Project, "Technical Specification Group Radio Access Network; Medium Access Control (MAC) Protocol Specification (Release 7)", 3GPP TS 25.321 V7.5.0, (Jun. 2007).

Third Generation Partnership Project, "Technical Specification Group Radio Access Network; Medium Access Control (MAC) Protocol Specification (Release 8)", 3GPP TS 25.321 V8.3.0, (Sep. 2008).

Third Generation Partnership Project, "Technical Specification Group Radio Access Network; Medium Access Control (MAC) Protocol Specification (Release 7)", 3GPP TS 25.321 V7.10.0, (Sep. 2008).

Ericsson et al., "New Work Item Proposal: Improved L2 for Uplink", 3GPP TSG-RAN Meeting #37, RP-070717, (Riga, Latvia, Sep. 11-14, 2007).

Catt, "Dual ARQ Structure," 3GPP TSG-RAN2 Meeting #50, R2-060080 (Jan. 9-13, 2006).

Huawei, "Considerations on segmentation/concatenation in LTE," 3GPP TSG RAN2 #50, R2-060028 (Jan. 9-13, 2006).

Nokia Corporation et al., "Introdcution of Enhanced Uplink in CELL_FACH state and Idle mode in 25.321," 3GPP TSG-RAN WG2 Meeting #62bis, R2-083344 (Jun. 30-Jul. 4, 2008).

Panasonic, "LTE—Data framing," 3GPP TSG RAN WG2#52, R2-060893, (Mar. 27-31, 2006).

Samsung et al., "Defining of reordering SDU and correction to the definition of the SI field," 3GPP TSG-RAN WG2#59, R2-073864 (Aug. 20-24, 2007).

* cited by examiner

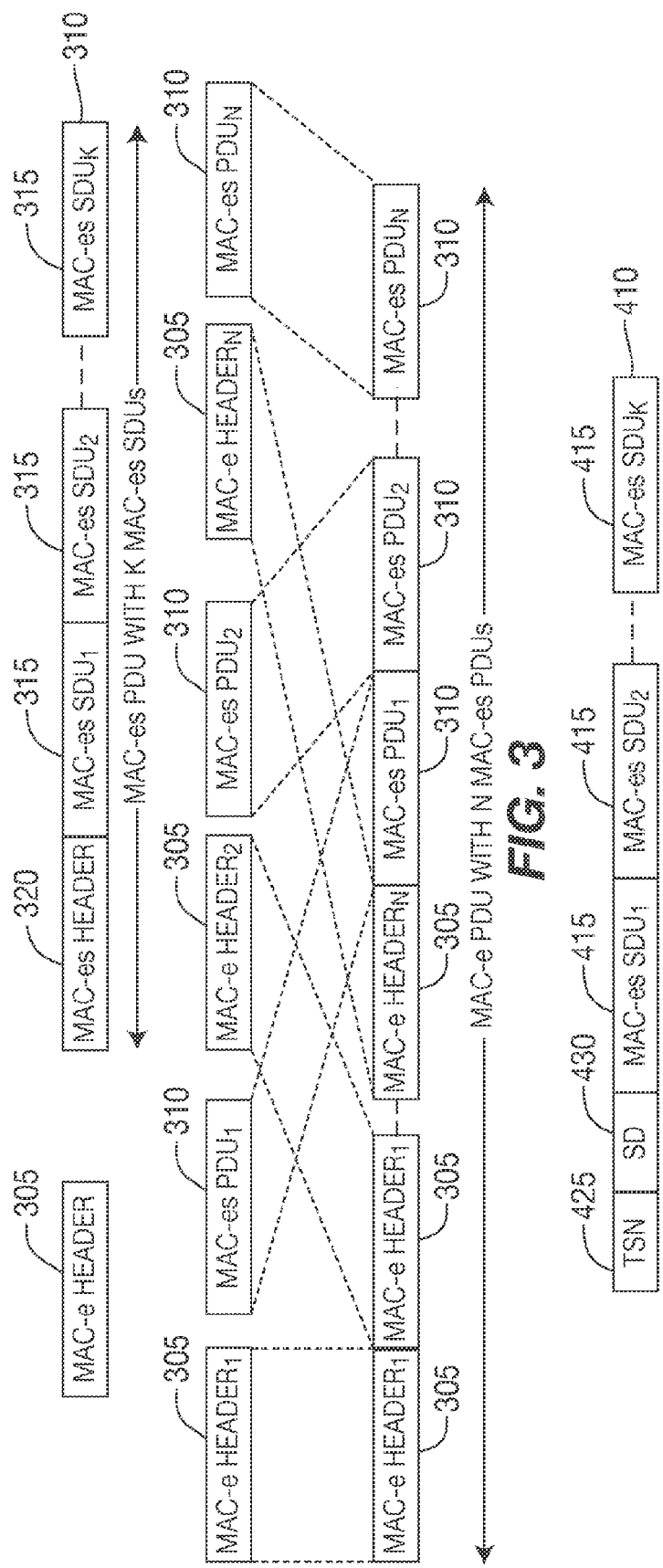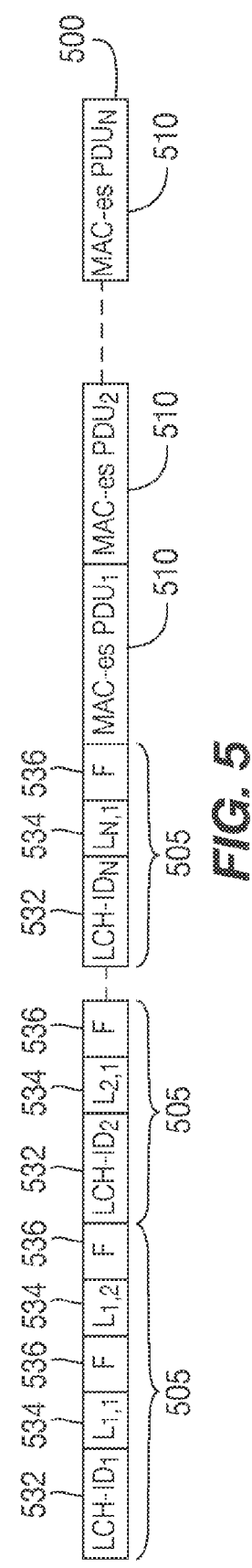

METHOD AND APPARATUS FOR LAYER 2 PROCESSING AND CREATION OF PROTOCOL DATA UNITS FOR WIRELESS COMMUNICATIONS

CROSS REFERENCE TO RELATED APPLICATIONS

This application claims the benefit of U.S. Provisional Application No. 60/976,057, filed Sep. 28, 2007, which is incorporated by reference as if fully set forth.

FIELD OF INVENTION

This application is related to wireless communications.

BACKGROUND

Wireless communication systems following Universal Mobile Telecommunications Systems (UMTS) technology, were developed as part of Third Generation (3G) Radio Systems, and are maintained by the Third Generation Partnership Project (3GPP). A typical UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit receive units (WTRUs), referred to as user equipments (UEs), via a Uu radio interface. A commonly employed air interface defined in the UMTS standard is wideband code division multiple access (W-CDMA). The UTRAN has one or more radio network controllers (RNCs) and base stations, referred to as Node Bs, which collectively provide for the geographic coverage for wireless communications with UEs. Uplink (UL) communications refer to transmissions from UE to Node B, and downlink (DL) communications refer to transmissions from Node B to UE. One or more Node Bs are connected to each RNC via an Iub interface; RNCs within a UTRAN communicate via an Iur interface.

According to 3GPP standard Release 6 for high speed uplink packet access (HSUPA), the MAC layer multiplexes higher layer data into MAC-e PDUs. In a transmission time interval (TTI), the MAC layer sends one MAC-e PDU to the PHY layer to be transmitted over the enhanced dedicated channel (E-DCH) dedicated physical data control channel (E-DPDCH). As part of link adaptation, the MAC layer performs enhanced transport format combination (E-TFC) selection based on radio link control (RLC) logical channel priority, RLC buffer occupancy, physical channel conditions, serving grants, non-serving grants, power limitations, hybrid automatic repeat request (HARQ) profile and logical channel multiplexing.

According to 3GPP standard Release 6, the radio link control (RLC) layer in acknowledged mode (AM) can only operate using fixed RLC protocol data unit (PDU) sizes. In addition, the high-speed medium access control (MAC-hs) entity in the Node B and the medium access control (MAC-e/es) entity in the UE do not support segmentation of the service data units (SDUs) from higher layers. These restrictions may result in performance limitations, especially as high speed packet access (HSPA) evolves towards higher data rates. In order to reach higher data rates and reduce protocol overhead and padding, a number of new features were introduced to the layer 2 (L2) protocol in 3GPP Release 7. In particular, flexible RLC PDU sizes and MAC segmentation in the downlink were introduced. However, corresponding L2 enhancements were not introduced for uplink operation in 3GPP Release 7.

More recently, a new 3GPP work item has been proposed for Improved L2 Uplink to introduce enhancements to L2 operation in the uplink. Some of the objectives of Improved L2 Uplink include: support for flexible RLC PDU sizes; support for MAC segmentation of higher layer PDUs including MAC-d and MAC-c PDUs; smooth transition between old and new protocol formats; and support for seamless state transitions between the CELL_DCH, CELL_FACH, CELL_PCH and URA_PCH states, dependent on potential enhancements to the CELL_FACH uplink transmission.

According to 3GPP Release 7, two MAC sub-layers, MAC-e and MAC-es, handle the enhanced dedicated transport channel (E-DCH) in the uplink. MAC-es sits on top of MAC-e and receives dedicated MAC (MAC-d) PDUs directly from the MAC-d entity. MAC-es SDUs (i.e. MAC-d PDUs) of the same size, coming from a particular logical channel are multiplexed together into a single MAC-es payload, and there is only one MAC-es PDU per logical channel per transmission time interval (TTI) since only one MAC-d PDU size is allowed per logical channel per TTI. A MAC-es header is prepended to the MAC-es payload. The number of PDUs N and a data description indicator (DDI) value identifying the logical channel, the MAC-d flow and the MAC-es SDU size are included as part of the MAC-e header. In case sufficient space is left in the E-DCH transport block or if Scheduling Information (SI) needs to be transmitted, an SI is included at the end of the MAC-e PDU. Multiple MAC-es PDUs from multiple logical channels can be included, but only one MAC-e PDU can be transmitted in a TTI.

According to 3GPP Release 7, all MAC-d PDUs contained in a MAC-es PDU are fixed to a preconfigured PDU size. In contrast, according to the Improved L2 Uplink work item, a MAC-es PDU may contain one or more MAC-d PDUs, MAC-c PDUs or RLC PDUs, or segments thereof, of different sizes as received from higher layers. The existing MAC-e/es headers and protocols according to 3GPP Release 7 or earlier do not support such flexibility in MAC-es SDU sizes. For example, the data description indicator (DDI) field that indicates the Logical channel ID, MAC-d flow ID, and the PDU size can no longer be used, because the MAC-es PDU size will not be from a set of fixed sizes. More generally, introduction of segmentation at the MAC layer increases the complexity in designing a low-overhead process for the MAC-e/es header. Therefore, it is desirable to have efficient methods of specifying the lengths of MAC-es SDUs, the logical channel it belongs to, and how it is segmented when flexible RLC PDU sizes and MAC segmentation are permitted.

SUMMARY

Methods and apparatus for layer 2 processing and creating protocol data units (PDUs) for wireless communications are disclosed. Processing at the medium access control (MAC) layer and creation of PDUs supports flexible higher layer PDU sizes as well as MAC layer segmentation in uplink wireless communications. Enhanced MAC-es PDUs are created by concatenating enhanced MAC-es service data units (SDUs) based on higher layer PDUs and segments thereof, where segmentation information is included in the enhanced MAC-es headers. An enhanced MAC-e header is generated for each enhanced MAC-es PDU to describe information about the enhanced MAC-es PDU. An enhanced MAC-e PDU is created by concatenating enhanced MAC-es PDUs and enhanced MAC-e headers. An enhanced MAC-es header may include a Transmit Sequence Number (TSN) field, a Segmentation Description (SD) field, length (L) fields to indicate the length of each enhanced MAC-es SDU and logical channel indicator (LCH-ID) fields. An enhanced MAC-e header may include one or more logical channel indicator (LCH-ID) fields for corresponding enhanced MAC-es PDUs or enhanced MAC-es SDUs. Additionally, length (L) fields may be added to the enhanced MAC-e header to indicate the length of enhanced MAC-es SDUs. Various techniques are disclosed for indicating the end of the enhanced MAC-e header. In another embodiment, methods for efficient signaling over the Iub frame protocol are proposed to support MAC segmentation and flexible RLC PDU sizes. A number of enhanced MAC-es PDUs may be included in the enhanced dedicated channel (E-DCH) Iub frame format. Additionally, a LCH-ID of the enhanced MAC-es PDU, or a MAC-d flow ID may be included. For each LCH-ID, a number of enhanced MAC-es SDUs per enhanced MAC-es PDU and lengths of the enhanced MAC-es SDUs may be signaled.

BRIEF DESCRIPTION OF THE DRAWINGS

A more detailed understanding may be had from the following description, given by way of example in conjunction with the accompanying drawings wherein:

FIG. 3 shows a framework for enhanced MAC-e/es protocol data unit (PDU) creation and header structure, in accordance with the teachings herein;

FIG. 4 shows an enhanced MAC-es header structure, in accordance with one embodiment;

FIG. 5 shows an enhanced MAC-e PDU header format with one logical channel identification (LCH-ID) field per enhanced MAC-es PDU, in accordance with another embodiment;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Herein, enhanced MAC-e, enhanced MAC-es, and enhanced MAC-e/es are used to represent enhanced versions of existing medium access control (MAC) protocols in high speed packet access (HSPA), including, but not limited to, MAC-e, MAC-es and MAC-e/es. FIGS. 3-10 illustrate enhanced MAC-e packet data units (PDUs) and headers and enhanced MAC-es PDUs, service data units (SDUs) and headers in accordance with the embodiments, however, MAC-e and MAC-es labels are used due to space constraints.

A higher layer PDU may refer to a MAC-d PDU, a MAC-c PDU, or an RLC PDU. MAC-d, MAC-c and RLC PDUs may be treated equivalently in the proposed embodiments herein. An RLC PDU belongs to a dedicated logical channel and is forwarded to the MAC-d entity. The MAC-d entity then forwards the data to the enhanced MAC-es entity. The output of the MAC-d is called a MAC-d PDU. A MAC-d PDU includes data received from the dedicated control channel (DCCH) or the dedicated traffic channel (DTCH) logical channels, while a MAC-c PDU includes data received from common channels such as the common control channel (CCCH). For convenience, some of the embodiments herein may be described with reference to RLC PDUs, however, the embodiments are equally applicable to MAC-d or MAC-c PDUs and have the same functionality for RLC, MAC-d and MAC-c PDUs. Also, a measure of length or size refers to a number of bits or bytes, unless otherwise specified.

Figure 1:
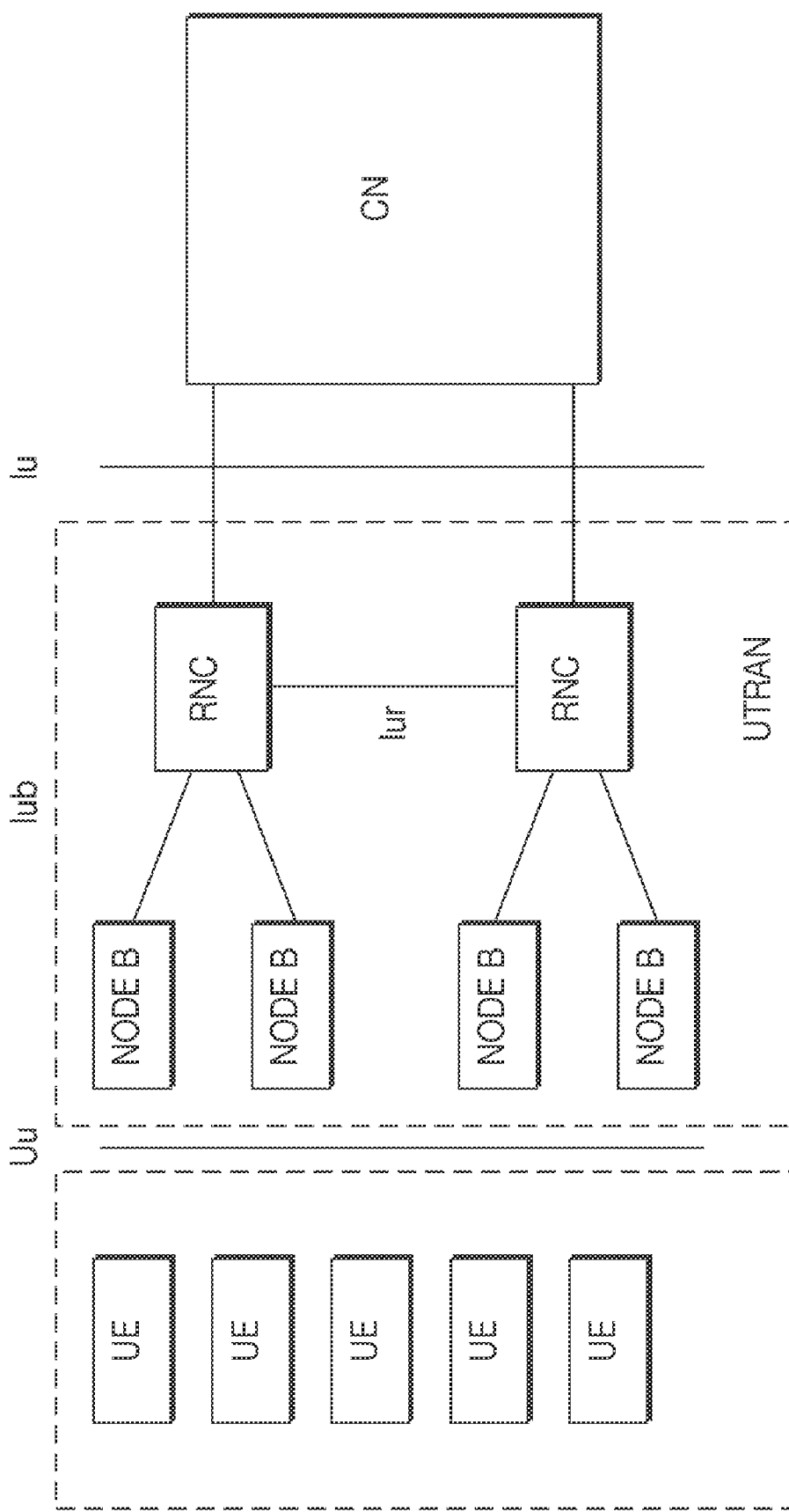
FIG. 1 shows an overview of the system architecture of a conventional Universal Mobile Telecommunications Systems (UMTS) network.
Figure 2:
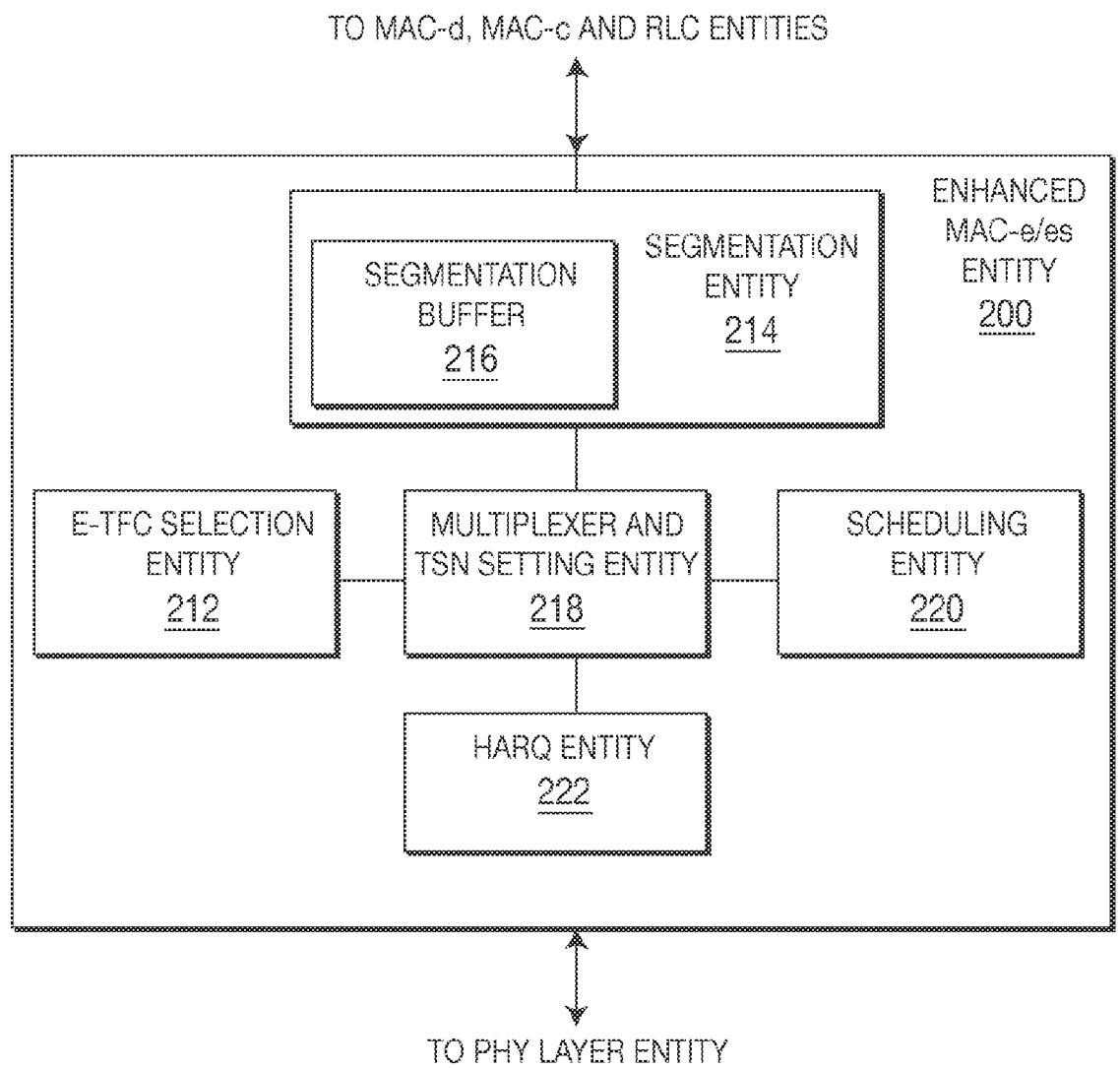
FIG. 2 shows an overview of an enhanced MAC-e/es entity in layer 2 (L2) in a wireless transmit/receive unit (WTRU) in accordance with the proposed Improved L2 Uplink work item.

FIG. 2 shows a block diagram of an enhanced MAC-e/es entity 200 in accordance with the teaching herein. The enhanced MAC-e/es entity 200 multiplexes logical channel data from higher layers entities, including the MAC-d, MAC-c, and radio link control (RLC) entities, into enhanced MAC-e PDUs and provides them in the form of transport blocks (TBs) to the physical (PHY) layer entity. The enhanced MAC-e/es entity 210 may include the following entities: a hybrid automatic repeat request (HARQ) entity 222, a segmentation entity 214, which may contain a segmentation buffer 216, a multiplexer and TSN setting entity 218, a scheduling entity 220, and an enhanced transport format combination (E-TFC) selection entity 212.

The HARQ entity 222 may be configured to handle MAC layer functions relating to the HARQ protocol for error correction, including storing and retransmitting enhanced MAC-e payloads. The segmentation entity 214 segments higher layer PDUs when they are too large to fit into the enhanced MAC-e PDU and sends the segment to multiplexer 218. The remaining segment is stored in the segmentation buffer 216. The multiplexer and TSN setting entity 218 is responsible for concatenating multiple enhanced MAC-es SDUs, which include segmented or complete higher layer PDUs, into enhanced MAC-es PDUs. The multiplexer and TSN setting entity 218 also multiplexes multiple enhanced MAC-es PDUs from the multiplexed logical channels into enhanced MAC-e PDUs to be provided to the PHY layer for transmission in the next transmission time interval (TTI) as instructed by the E-TFC selection entity 212. The scheduling entity 220 may be configured to route associated uplink signaling. The E-TFC selection entity 212 determines how much data can be sent in a TTI based on scheduling information, Relative Grants (RGs), Absolute Grants (AGs), and Serving Grants (SGs) and available power resources and determines E-TFC restriction, which is used to determine the maximum available data the UE can transmit based on available power. E-TFC selection entity 212 also controls the multiplexer 218.

FIG. 3 shows a framework for enhanced MAC-e/es PDU creation and header structure, in accordance with the teachings herein. The embodiments disclosed herein are consistent with this framework, and may be used alone or in any combination, as desired. An enhanced MAC-e PDU 300 for the enhanced dedicated transport channel (E-DCH) consists of one or more enhanced MAC-e headers 305 and one or more enhanced MAC-es PDUs 310. The enhanced MAC-es sub-layer receives higher layer PDUs or segments thereof, including RLC, MAC-d and MAC-c PDUs. Within the enhanced MAC-es sub-layer, the higher layer PDUs or segments thereof are referred to as enhanced MAC-es SDUs 315. The enhanced MAC-es sub-layer generates an enhanced MAC-es PDU 310 consisting of one or more enhanced MAC-es SDUs 315 and an enhanced MAC-es header 320. The enhanced MAC-es SDUs 315 may have different sizes. Generally, one enhanced MAC-e PDU 300 and multiple enhanced MAC-es PDUs 310 from multiple logical channels can be transmitted per transmission time interval (TTI).

According to one embodiment, segmentation may be performed per logical channel at the enhanced MAC-es sub-layer. Segmentation information may be signaled within the enhanced MAC-es header. The segmentation information may be a two bit field. The segmentation information indicates whether the first and/or last enhanced MAC-es SDUs of the enhanced MAC-es PDU are segments or are complete higher layer PDUs. Accordingly, the enhanced MAC-es header may contain two fields: a Transmit Sequence Number (TSN) field and a Segmentation Description (SD) field. The term SD is used to indicate the segmentation information so as not to be confused with the existing layer 2 scheduling information (SI) field that is used to transfer scheduling information, although any term can be used as desired. If, for example, the TSN field is six bits and the SD field is two bits, the enhanced MAC-es header becomes byte aligned. FIG. 4 shows an enhanced MAC-es header structure, in accordance with one embodiment. The enhanced MAC-es PDU 410 includes K enhanced MAC-es SDUs 415 and an enhanced MAC-es header 420, which includes the TSN field 425 and the SD field 430.

According to another embodiment, a logical channel indicator (LCH-ID) field may be added to the enhanced MAC-e header for every enhanced MAC-es PDU multiplexed in the enhanced MAC-e PDU in order to indicate the logical channel identity for each enhanced MAC-es PDU. The LCH-ID field may be present once per enhanced MAC-es PDU. Alternatively, an LCH-ID field may be present for each enhanced MAC-es SDU in the enhanced MAC-es PDU. The LCH-ID field in the enhanced MAC-e header can be used by the Node B to de-multiplex the enhanced MAC-e PDU into the proper flows to be sent to the radio network controller (RNC). If an LCH-ID field is used per enhanced MAC-es SDU, the Node B may be configured to determine that a new enhanced MAC-es PDU has started when the value of the next LCH-ID field is different from the previously read LCH-ID field. Because the LCH-IDs will be unique within each enhanced MAC-e/es entity, the mapping between the LCH-ID and the MAC-d flow may be known by both the WTRU and the network. Based on the LCH-ID, the Node B can route the corresponding enhanced MAC-es PDU to the appropriate MAC-d flow. Additionally, an individual length (L) field may be included for each enhanced MAC-es SDU within an enhanced MAC-es PDU included in the enhanced MAC-e header in order to indicate the length of that enhanced MAC-es SDU.

To signal the end of the enhanced MAC-e header or the presence of an L field for the case where a single LCH-ID per enhanced MAC-es PDU is used, any one or more of the following techniques can be used, alone or in combination. A finish length field ($F_L$) flag may be used to indicate, for the logical channel or enhanced MAC-es PDU, that no more L fields are present. The field following the $F_L$ flag field may either be another LCH-ID or the end of the enhanced MAC-e header. In one alternative, the end of the enhanced MAC-e header can be implicitly detected by the Node B. In another alternative, a special reserved value of the LCH-ID may be used to indicate the end of the enhanced MAC-e header or the presence of the SI field. The special reserved value of the LCH-ID may be included at the end of the enhanced MAC-e header or may only be present when there is enough empty space in the enhanced MAC-e PDU. In another alternative, a finish header ($F_H$) flag may be used to indicate the end of the enhanced MAC-e header. In another alternative, a finish (F) flag in the enhanced MAC-e header may indicate any one or more of the following: no more L fields are present for the LCH-ID or enhanced MAC-es PDU, but it is not the end of the enhanced MAC-e header; no more L fields are present and it is the end of the enhanced MAC-e header; and there are more LCH-ID and L field to follow. Optionally, the F flag may be a two bit field.

FIG. 5 shows an enhanced MAC-e PDU header format with one LCH-ID field per enhanced MAC-es PDU, in accordance with another embodiment. The enhanced MAC-e PDU 500 includes N enhanced MAC-es PDUs 510 and N enhanced MAC-e headers 505. Each enhanced MAC-e header 505 comprises an LCH-ID field 532 indicating the logical channel for the enhanced MAC-es PDU, one or more L fields 534 indicating the length of enhanced MAC-es SDUs, and an F field 536 to indicate the location within the header as described above.

To signal the end of the enhanced MAC-e header or the presence of an L field for the case where a LCH-ID field per enhanced MAC-es SDU is used, any one or more of the following techniques can be used, alone or in combination. The LCH-ID of each enhanced MAC-es SDU or segment may be followed by an L field. An enhanced MAC-es SDU from the same logical channel has the same LCH-ID in the header, and thus a change in the LCH-ID header may indicate the end of the corresponding enhanced MAC-es PDU. Optionally, a special reserved value of the LCH-ID field may be used to indicate the end of the header or the presence of SI. The special reserved value of the LCH-ID may be included at the end of the header or may only be present when there is enough empty space in the enhanced MAC-e PDU. Alternatively, the end of the enhanced MAC-e header can be implicitly detected by the Node B. Additionally, any one of the flag fields $F_H$, $F_L$ or F as described above may be used to indicate the end of the header.

Figure 6:
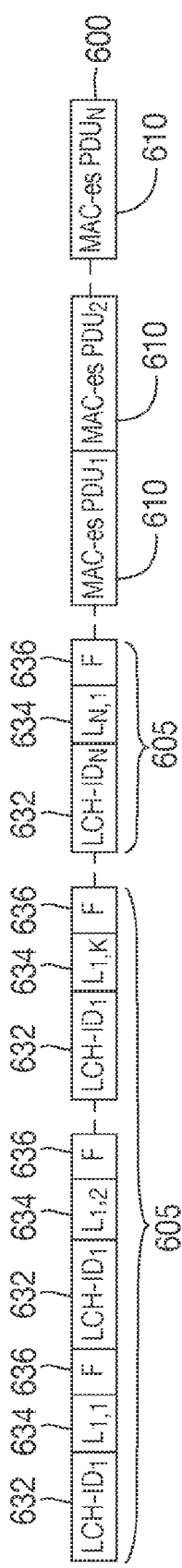
FIG. 6 shows an enhanced MAC-e header format with the LCH-ID field repeated for every enhanced MAC-es SDU or segment, in accordance with another embodiment.

FIG. 6 shows an enhanced MAC-e header format with the LCH-ID field repeated for each enhanced MAC-es SDU, in accordance with another embodiment. The enhanced MAC-e PDU 600 includes N enhanced MAC-es PDUs 610 and N enhanced MAC-e headers 605. Each enhanced MAC-e header 605 comprises at least K LCH-ID fields 632 indicating the logical channel for each enhanced MAC-es SDU in the enhanced MAC-es PDU, K L fields 634 indicating the length of each enhanced MAC-es SDU, and K F flags indicating if more fields are present in the enhanced MAC-e header or if it is the end of the enhanced MAC-e header.

In accordance with another embodiment, methods for efficient signaling over the Iub frame protocol are disclosed in order to support the changes introduced in the Improved L2

Uplink work item. On the UTRAN side, the enhanced MAC-es entity resides in the serving radio network controller (SRNC) and the enhanced MAC-e entity resides in the Node B. The enhanced MAC-es entity is generally not aware of the enhanced MAC-es SDU descriptors and the logical channel to which an enhanced MAC-es PDU belongs. Because this information is generally included in the enhanced MAC-e header only, it may not be forwarded by the Node B to the RNC together with the enhanced MAC-es SDU. The Iub frame protocol may be modified so that any useful information can be sent from the enhanced MAC-e entity in the Node B to the enhanced MAC-es entity in the SRNC.

More specifically, the DDI and N fields do not need to be sent to the enhanced MAC-es entity in the SRNC. As described above, the N field gives the number of enhanced MAC-es SDUs in an enhanced MAC-es PDU and the DDI fields gives the index to a MAC-d flow, logical channel, and PDU length. However, any one or more of the following fields may be included for the E-DCH Iub frame format: number of enhanced MAC-es PDUs, LCH-ID and length of the enhanced MAC-es SDU, and/or MAC-d flow ID. Additionally, for each LCH-ID, a number of enhanced MAC-es SDUs per enhanced MAC-es PDU may be provided as well as a length of enhanced MAC-es SDUs.

Figure 7:
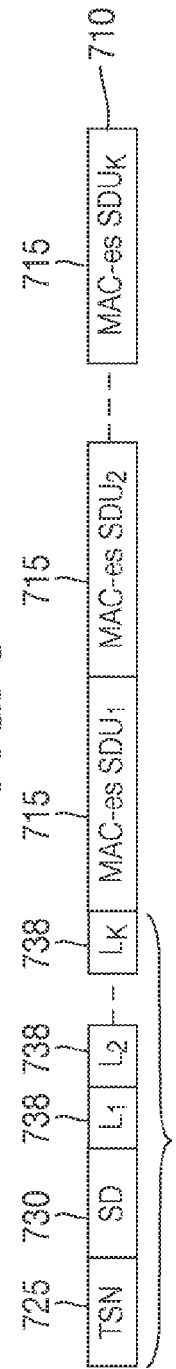
FIG. 7 shows an enhanced MAC-es PDU format with N enhanced MAC-es SDUs and N length indicator fields, in accordance with another embodiment.

According to an alternate embodiment, specific enhanced MAC-es SDU descriptors can be directly incorporated in the enhanced MAC-es header. An L field may be used to indicate the length of the enhanced MAC-es SDU or segment. After the TSN and SD fields, an L field may be included for every enhanced MAC-es SDU. The end of the enhanced MAC-es header can be implicitly detected by the receiving enhanced MAC-es entity, or it can be explicitly indicated by the use of a finish (F) flag. FIG. 7 shows an enhanced MAC-es PDU format with K enhanced MAC-es SDUs and K length (L) indicator fields, in accordance with another embodiment. The enhanced MAC-es PDU 710 includes K enhanced MAC-es SDUs 715, and enhanced MAC-es header 720. The enhanced MAC-es header 720 includes TSN field 725, SD field 730 and K L fields 738 to indicate the length of each enhanced MAC-es SDU 715.

Figure 8:
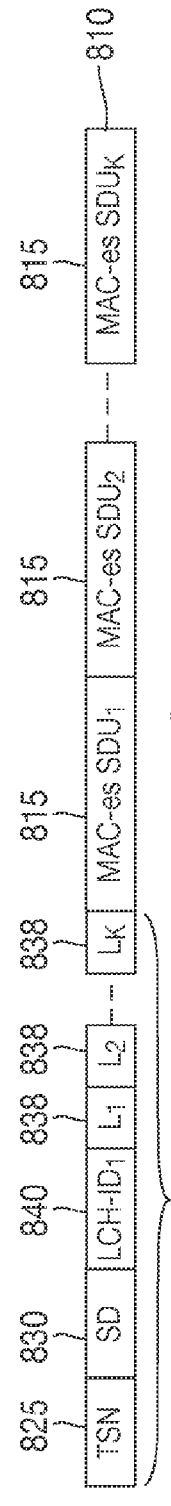
FIG. 8 shows an enhanced MAC-es PDU format with LCH-ID, N enhanced MAC-es SDUs and N length indicator fields, in accordance with another embodiment.

According to another embodiment, the LCH-ID field can be included in the enhanced MAC-es header. The LCH-ID may be present only once per enhanced MAC-es PDU together with the TSN and SD fields. Alternatively, the LCH-ID may be repeated for every enhanced MAC-es SDU. This alternative would allow for the demultiplexing and routing of the packets in the enhanced MAC-es entity. FIG. 8 shows an enhanced MAC-es PDU format with LCH-ID, K enhanced MAC-es SDUs and K length indicator fields, in accordance with another embodiment. The enhanced MAC-es PDU 810 includes K enhanced MAC-es SDUs 815 and enhanced MAC-es header 820. The enhanced MAC-es header 820 includes TSN field 825, SD field 830, K L fields 838 and LCH-ID field 840.

Figure 9:
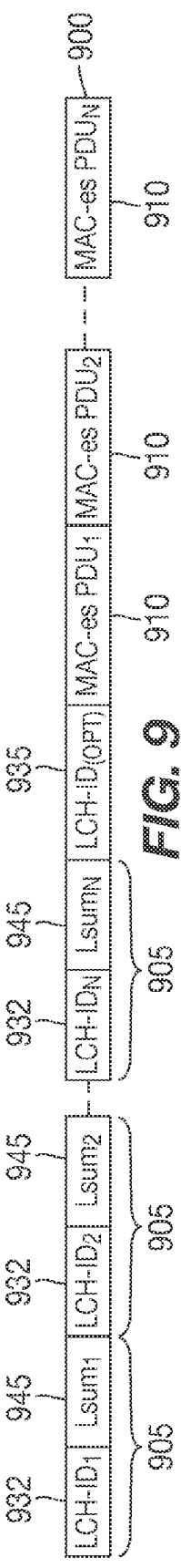
FIG. 9 shows an enhanced MAC-e PDU format with a total length indictor field, in accordance with another embodiment.

If the demultiplexing of the enhanced MAC-e PDU is performed by the Node B, a method may be defined to allow the Node B to know the size of the enhanced MAC-es PDU in the enhanced MAC-e PDU. Therefore, in order to signal the size and logical channel of the enhanced MAC-es PDU, the enhanced MAC-e header may contain an LCH-ID field and one length indicator field for every enhanced MAC-es PDU. The length indicator field, $L_{sum}$, corresponds to the total enhanced MAC-es PDU size corresponding to the logical channel identified by the LCH-ID field. The size of the length indicator field $L_{sum}$ may large enough to account for the biggest enhanced MAC-es PDU size. For example, the $L_{sum}$ field may be the sum of all L fields in the enhanced MAC-es PDU header plus the length of enhanced MAC-es PDU header. The end of the enhanced MAC-e header can be detected implicitly, by a special reserved LCH-ID value or by a finish (F) flag as described above. FIG. 9 shows an enhanced MAC-e PDU format with a total length indictor field, in accordance with another embodiment. The enhanced MAC-e PDU 900 includes N enhanced MAC-es PDUs 910, and N enhanced MAC-e headers 905 and optionally LCH-ID field 935 to indicate the end of the enhanced MAC-e header 905. Each enhanced MAC-e header 905 includes an LCH-ID field 932 and an $L_{sum}$ field 945.

According to another embodiment, a DDI field can be used. A set of DDI indexes may be configured by higher layers. The size indicated in the DDI field gives the size of the total enhanced MAC-es PDU included in the enhanced MAC-es PDU. The logical channel is identified by the DDI field so no additional LCH-ID is required to be added. Alternatively, a separate LCH-ID can be included and the DDI field is used to indicate a set of sizes, thus allowing a bigger set of sizes to be used. In another alternative, in order to allow for a bigger set of sizes to be used, the DDI field can be used in conjunction with the N field to give the size of the enhanced MAC-es PDU. For example the total enhanced MAC-es PDU size can be DDI*N bits long, where N is the value of the N field.

Alternatively, multiple DDI and N fields can be used to indicate the size of one enhanced MAC-es PDU, if the set of sizes being used is not sufficient to indicate the size of the enhanced MAC-es PDU. For example, the index set of DDI can be configured in multiples of 10 bits (for example, 1, 10, 100, 1000 and so on). If the enhanced MAC-es size is not a multiple of any of the configured DDIs, several DDI fields can be used to indicate the size. The sum of all DDI×N fields corresponding to the same logical channels gives the total size of the enhanced MAC-es PDU. For example, if the size of the PDU is 23000 bits, the corresponding DDI and N fields are: $DDI_1$ index=10000 and $N_1$=2 such that $DDI_1 \times N_1$=20000, and $DDI_2$ index=1000 and $N_2$=3 such that $DDI_2 \times N_2$=3000. Alternatively, the de-multiplexing function may be moved to the enhanced MAC-es sub-layer in the RNC. In this case, no enhanced MAC-e header is required for an enhanced MAC-es header similar to that shown in FIG. 7. The enhanced MAC-e PDU consists of the multiplexing of multiple enhanced MAC-es PDUs without any enhanced MAC-e header, according to the general structure shown in FIG. 3.

According to another embodiment, the Iub frame protocol may signal any of the following information, alone or in combination: the number of enhanced MAC-es PDUs and the LCH-ID of each enhanced MAC-es PDU; the number of enhanced MAC-es PDUs, the LCH-ID of each enhanced MAC-es PDU and the total length of each enhanced MAC-es PDU; the number of enhanced MAC-es PDUs, and the DDI and N fields of each enhanced MAC-es PDU; the number of DDI and N fields, and the DDI and N fields; and the number of enhanced MAC-es PDUs, the number of DDI and N field per enhanced MAC-es PDU, and all the DDI and N fields for each enhanced MAC-es PDU.

According to another embodiment, one common header may be used. The signaling and descriptors may be included in only one of the headers, that is either the enhanced MAC-e header or enhanced MAC-es header. If the enhanced MAC-e header is used, the enhanced MAC-e header can contain any combination of enhanced MAC-es and enhanced MAC-e headers described herein. More specifically, the common MAC header preferably contains to following information, for every enhanced MAC-es PDU: a TSN field, an SD field, an LCH-ID field and a length indicator of the enhanced MAC-es SDUs.

Once the hybrid automatic retransmit request (HARQ) processing for an enhanced MAC-e PDU is complete and the enhanced MAC-e PDU is successfully received, it is sent to the SRNC via the Iub as a full packet. No de-multiplexing into the corresponding MAC-d flows is performed in the Node B. If the SI is included in the enhanced MAC-e PDU, the Node B may be responsible for extracting the SI and possibly removing padding. To indicate the presence of SI and to allow the Node B to extract the SI, a Length (L) field can be included in the enhanced MAC-e header. In this case, the L field indicates the total length of data included in the enhanced MAC-e PDU. The Node B can use this information to extract the data part of the enhanced MAC-e PDU and the SI and padding if present.

Figure 10:
FIG. 10 shows an enhanced MAC-e header with a one bit header field indicating Scheduling Information (SI) presence, in accordance with another embodiment.

Alternatively, the L field may be included in the header if the SI is included in the enhanced MAC-e PDU. The presence of the SI can be signaled by a one bit header field. If the bit is set indicating that the SI is present, then the L field may follow the one bit header field, otherwise if SI is indicated as not being present the L field may be omitted. Alternatively, no L field may be included in the header. A one-bit indicator field is included that indicates whether SI is present in the enhanced MAC-e PDU. If padding bits are added, the padding bits follow the data and the SI is concatenated to the end of the enhanced MAC-e PDU after padding. The last 18 bits are reserved for the SI. The Node B may extract the last 18 bits corresponding to the SI, and send the remaining data with padding to the enhanced MAC-es entity, such that the enhanced MAC-es entity can remove the padding. There may be only one Iub flow that sends data to the RNC for each WTRU, as opposed to one Iub flow for every MAC-d flow. In addition, the Iub frame protocol does not need to indicate the number of enhanced MAC-es PDUs, the DDI and N fields. FIG. 10 illustrates an enhanced MAC-e header with a one bit header field indicating SI presence, in accordance with another embodiment. The enhanced MAC-e PDU 100 includes MAC payload 105, enhanced MAC-e header 110 including a one bit header (H) field indicating SI presence, padding bits 115 and SI field 120.

Upon reception of the enhanced MAC-e PDU, the RNC is responsible for any one or more of the following: de-multiplexing the enhanced MAC-e PDU; extracting the segmentation information; reassembling packets, if segmented; sending the enhanced MAC-es PDUs to the appropriate logical channel; and optionally, removing any padding bits from the enhanced MAC-e PDU, if the removal is not performed in the Node B.

According to another embodiment, if the enhanced MAC-es SDUs are of similar size, the repetition of the L field for every enhanced MAC-es SDU may result in an inefficient signaling method and increased overhead. To overcome this, enhanced MAC-es SDUs may be described by a single length indicator (L) field and an N field indicating the number of enhanced MAC-es SDUs with the same size. The N field may be present after every L field, or it may be present only when more than one enhanced MAC-es SDU of the same size is present. In the latter case, in order to indicate the presence of the N field, an additional bit may be added after the L field indicating the presence of the N field.

Alternatively, one or more special L field values may be used. Some values can be reserved and configured by the network to represent a set of fixed sizes. For example, one of the values can represent the maximum RLC PDU size being used. When more than one enhanced MAC-es SDU of this size is present in the enhanced MAC-es PDU, the special L field followed by an N field can be used. The presence of the N field can be implicitly known when one of these values is used. The mapping between the L field value and the length preferably is known by both the WTRU and the network.

According to another embodiment, the restriction of having only one enhanced MAC-es PDU from one logical channel per TTI may be removed. Then, the enhanced MAC-es may be allowed to create one or more enhanced MAC-es PDUs per logical channel in one TTI. One enhanced MAC-es PDU may carry enhanced MAC-es SDUs of the same size. If several enhanced MAC-es SDUs with different sizes exist in the logical channel, different enhanced MAC-es PDUs are created for every size.

For this embodiment, to indicate segmentation information and TSN number, any one or more of the following procedures can be used, alone or in combination. According to one procedure, for each logical channel, one TSN field and SD field may be included in the first enhanced MAC-es PDU and the following enhanced MAC-es PDUs of that logical channel contain no header information. The segmentation information is interpreted as described above, except that the SD field preferably indicates whether the first and/or last enhanced MAC-es PDUs of the same logical channel contains a segment. In another procedure, a TSN field and an SD field is included in each enhanced MAC-es PDU. The TSN number can be the same across all enhanced MAC-es PDUs of the logical channel, or it can be incremented for each new enhanced MAC-es PDU created. The SD field may contain specific segmentation information on each enhanced MAC-es PDU. Optionally, a TSN field may be present only once in the first enhanced MAC-es PDU and the SD field may be repeated per enhanced MAC-es PDU.

According to another embodiment, the logical channel indicator may have any one or more of the following forms, alone or in combination. In one form, an LCH-ID field is present for every enhanced MAC-es PDU, even if it is from the same logical channel. In another form, the LCH-ID field is present only once for all the enhanced MAC-es PDUs that corresponds to the same logical channel. In another form, an LCH-ID field may be repeated for every enhanced MAC-es SDU within an enhanced MAC-es PDU.

The length indicator may have any one or more of the following forms, alone or in combination. In one form, the length indicator is present once for every enhanced MAC-es PDU. In another form, the length indicator is present for every enhanced MAC-es SDU within an enhanced MAC-es PDU. In another form, the length indicator is present only once for every enhanced MAC-es PDU accompanied by an N field indicating the number of enhanced MAC-es SDUs of the same size within the enhanced MAC-es PDU. Alternatively, the DDI field and N field may be used for every enhanced MAC-es PDU of the same logical channel.

According to another embodiment, only one logical channel may be allowed to segment a packet. In this case, no other logical channels may be allowed to perform segmentation without completing the transmission of the remaining segment. The segmentation information may be included per logical channel as described above or it may be included only once at the beginning of the enhanced MAC-e header. The segments may be allowed to reside only at the beginning of the first enhanced MAC-es PDU or at the end of the last enhanced MAC-es PDU. Therefore, the interpretation of the segmentation information will indicate whether the first enhanced MAC-es SDU of the first enhanced MAC-es PDU and/or the last enhanced MAC-es SDU of the last enhanced MAC-es PDU are segments. The SI indication may be carried over the Iub frame protocol from the Node B to the RNC, where reassembly is performed. Alternatively, the reassembly may be performed in the enhanced MAC-e in the Node B. The header descriptors other than the SI can be signaled using one or a combination of the methods disclosed hereinbefore.

According to another embodiment, logical channels may be allowed to be multiplexed into a MAC-d flow. The enhanced MAC-es PDU is constructed per MAC-d flow instead of per logical channel. Therefore, multiplexing is done on two levels, at the enhanced MAC-es level and the enhanced MAC-e level. The segmentation information and TSN may be signaled only once per MAC-d flow, rather than being included for every logical channel flow. Alternatively, the SI information may be included for each group of enhanced MAC-es SDU belonging to the same logical channel. Alternatively, the SI may be included for each enhanced MAC-es SDU and the interpretation of the SI is on a per enhanced MAC-es SDU basis, instead of on a group of enhanced MAC-es SDUs. In addition, the logical channel identification and the length indicators may be done using one or a combination of the methods disclosed hereinbefore. Additionally, a version flag could be added to the enhanced MAC-es header to indicate which version of the enhanced MAC-es is used.

Figure 11:
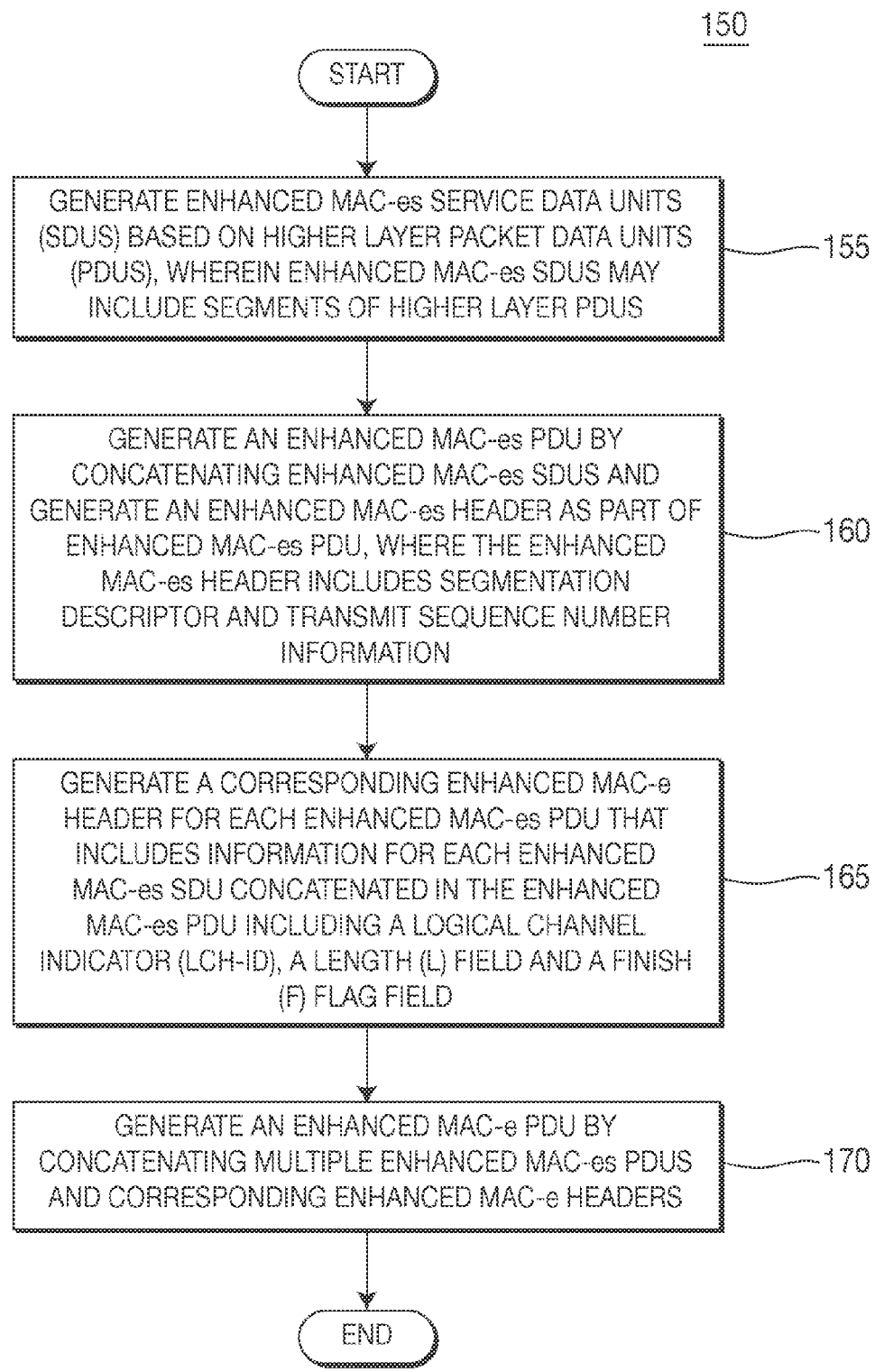
FIG. 11 shows a flow diagram of a procedure for generating an enhanced MAC-e PDU in accordance with one embodiment.

FIG. 11 shows a flow diagram of a procedure 150 for generating an enhanced MAC-e PDU in accordance with one embodiment. In step 155, enhanced MAC-es SDUs are generated based on higher layer PDUs, where the enhanced MAC-es SDUs may include segments of higher layer PDUs. In step 160, an enhanced MAC-es PDU is generated by concatenating enhanced MAC-es SDUs and an enhanced MAC-es header is generated as part of the MAC-es PDU, where the enhanced MAC-es header includes segmentation descriptor (SD) and transmit sequence number (TSN) information. In step 165, a corresponding enhanced MAC-e header is generated for each enhanced MAC-es PDU that includes information for each enhanced MAC-es SDU concatenated in the enhanced MAC-es PDU including a logical channel indicator (LCH-ID), a length (L) field and a finish (F) flag field. In step 170, an enhanced MAC-e PDU is generated by concatenating multiple enhanced MAC-es PDUs and corresponding MAC-e headers. Additionally, any one or more of the header fields described above and in FIGS. 3-10 may be added to the headers in the enhanced MAC-e PDU as part of procedure 150. The procedure 150 of FIG. 11 may be performed by the enhanced MAC-e/es entity 200 of FIG. 2.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for creating protocol data unit (PDU) to be passed to a physical layer for uplink wireless communications, the method comprising:
   a wireless transmit/receive unit (WTRU) generating enhanced MAC-es service data units (SDUs) based on higher layer packet data units (PDUs), wherein each enhanced MAC-es SDU includes at least one complete higher layer PDU or at least one segment of a higher layer PDU;
   the WTRU generating an enhanced MAC-es PDU by concatenating a plurality of enhanced MAC-es SDUs and generating an enhanced MAC-es header as part of the enhanced MAC-es PDU, wherein the enhanced MAC-es header includes a segmentation descriptor (SD) field that indicates whether at least one enhanced MAC-es SDU concatenated in the enhanced MAC-es PDU is a complete or segmented higher layer PDU;
   the WTRU generating a corresponding enhanced MAC-e header for each enhanced MAC-es PDU that describes information of each enhanced MAC-es SDU concatenated in the enhanced MAC-es PDU; and
   the WTRU generating an enhanced MAC-e PDU by concatenating multiple enhanced MAC-es PDUs and corresponding enhanced MAC-e headers.

2. The method of claim 1, wherein the higher layer PDUs include at least one of a MAC-d PDU, a MAC-c PDU, or a radio link control (RLC) PDU.

3. The method of claim 1 wherein the SD field indicates if a first enhanced MAC-es SDU is a segment or a complete higher layer PDU.

4. The method of claim 1 wherein the SD field indicates if a last enhanced MAC-es SDU is a segment or a complete higher layer PDU.

5. The method of claim 1 wherein the SD field is 2 bits.

6. The method of claim 1 wherein the enhanced MAC-es header further includes a Transmit Sequence Number (TSN) field.

7. The method of claim 6 wherein the TSN field is 6 bits.

8. The method of claim 1 further comprising: adding one logical channel indicator (LCH-ID) field to the corresponding enhanced MAC-e header for each enhanced MAC-es PDU to indicate a logical channel identity for each enhanced MAC-es PDU.

9. The method of claim 8 further comprising: adding a length (L) field to the corresponding enhanced MAC-e header for each enhanced MAC-es SDU to indicate a length of each enhanced MAC-es SDU.

10. The method of claim 9 further comprising: adding a one bit finish flag (F) field to the corresponding enhanced MAC-e header for each enhanced MAC-es SDU to indicate the end of the enhanced MAC-e header.

11. The method of claim 8 further comprising:
   adding a finish (F) flag to the corresponding enhanced MAC-e header to indicate at least one of: no more L fields are present and the end of enhanced MAC-e header has not been reached, no more L fields are present and the end of the enhanced MAC-e header has been reached, and more L fields are present.

12. The method of claim 1 further comprising:
   adding one logical channel indicator (LCH-ID) field to the corresponding enhanced MAC-e header for each enhanced MAC-es SDU concatenated in the enhanced MAC-es PDU to indicate a logical channel identity for each enhanced MAC-es SDU.

13. The method of claim 12 further comprising:
adding a length (L) field after each LCH-ID field in the corresponding enhanced MAC-e header to indicate a length of each enhanced MAC-es SDU.

14. The method of claim 13 further comprising:
adding a finish flag (F) field after each L field in the corresponding enhanced MAC-e header to indicate the end of the enhanced MAC-e header or if more fields remain in the enhanced MAC-e header.

15. The method of claim 13 wherein a change in a LCH-ID value indicates an end of an enhanced MAC-es PDU.

16. The method of claim 1 wherein enhanced MAC-es SDUs do not include segments of higher layer PDUs.

17. A method for generating an Iub enhanced dedicated channel (E-DCH) data frame to be communicated from a Node B to a radio network controller (RNC), the method comprising:
adding to the Iub E-DCH data frame a one or more enhanced MAC-es Protocol Data Units (PDUs), wherein the enhanced MAC-es PDUs include at least one of segmented or complete higher layer PDUs; and
adding to the Iub E-DCH data frame a descriptor field for each of the one or more enhanced MAC-es PDUs, wherein each descriptor field comprises K logical channel indicator (LCH-ID) fields for each corresponding enhanced MAC-es PDU of the one or more enhanced MAC-es PDUs, where K is the number of enhanced MAC-es SDUs concatenated in the corresponding enhanced MAC-es PDU.

18. The method of claim 17, wherein each descriptor field further comprises K length (L) fields and K finish (F) flags for each corresponding enhanced MAC-es PDU of the one or more enhanced MAC-es PDUs.

19. A wireless transmit/receive unit (WTRU) configured to create protocol data unit (PDU) to be passed to a physical layer for uplink wireless communications, the WTRU comprising:
an enhanced MAC-e/es entity configured to generate enhanced MAC-es service data units (SDUs) based on higher layer packet data units (PDUs), wherein each enhanced MAC-es SDU includes at least one complete higher layer PDU or at least one segment of a higher layer PDU;
the enhanced MAC-e/es entity configured to generate an enhanced MAC-es PDU by concatenating a plurality of enhanced MAC-es SDUs and generating an enhanced MAC-es header as part of the enhanced MAC-es PDU, wherein the enhanced MAC-es header includes a segmentation descriptor (SD) field that indicates whether at least one enhanced MAC-es SDU concatenated in the enhanced MAC-es PDU is a complete or segmented higher layer PDU; and
the enhanced MAC-e/es entity configured to generate an enhanced MAC-e PDU by concatenating multiple enhanced MAC-es PDUs and corresponding enhanced MAC-e headers.

20. The WTRU of claim 19, wherein the higher layer PDUs include at least one of a MAC-d PDU, a MAC-c PDU, or a radio link control (RLC) PDU.

21. The WTRU of claim 19, wherein the SD field indicates if a first enhanced MAC-es SDU is a segment or a complete higher layer PDU.

22. The WTRU of claim 19 wherein the SD field indicates if a last enhanced MAC-es SDU is a segment or a complete higher layer PDU.

23. The WTRU of claim 19 wherein the SD field is 2 bits.

24. The WTRU of claim 19 wherein the enhanced MAC-es header further includes a Transmit Sequence Number (TSN) field.

25. The WTRU of claim 24 wherein the TSN field is 6 bits.

26. The WTRU of claim 19 wherein: the enhanced MAC-e/es entity is configured to add one logical channel indicator (LCH-ID) field to the corresponding enhanced MAC-e header for each enhanced MAC-es PDU to indicate a logical channel identity for each enhanced MAC-es PDU.

27. The WTRU of claim 26 wherein: the enhanced MAC-e/es entity is configured to add a length (L) field to the corresponding enhanced MAC-e header for each enhanced MAC-es SDU to indicate a length of each enhanced MAC-es SDU.

28. The WTRU of claim 27 wherein: the enhanced MAC-e/es entity is configured to add a one bit finish flag (F) field to the corresponding enhanced MAC-e header for each enhanced MAC-es SDU to indicate the end of the enhanced MAC-e header.

29. The WTRU of claim 26 wherein:
the enhanced MAC-e/es entity is configured to add a finish (F) flag to the corresponding enhanced MAC-e header to indicate at least one of: no more L fields are present and the end of enhanced MAC-e header has not been reached, no more L fields are present and the end of the enhanced MAC-e header has been reached, and more L fields are present.

30. The WTRU of claim 19 wherein: the enhanced MAC-e/es entity is configured to add one logical channel indicator (LCH-ID) field to the corresponding enhanced MAC-e header for each enhanced MAC-es SDU concatenated in the enhanced MAC-es PDU to indicate a logical channel identity for each enhanced MAC-es SDU.

31. The WTRU of claim 30 wherein: the enhanced MAC-e/es entity is configured to add a length (L) field after each LCH-ID field in the corresponding enhanced MAC-e header to indicate a length of each enhanced MAC-es SDU.

32. The WTRU of claim 31 wherein: the enhanced MAC-e/es entity is configured to add a finish flag (F) field after each L field in the corresponding enhanced MAC-e header to indicate the end of the enhanced MAC-e header or if more fields remain in the enhanced MAC-e header.

33. The WTRU of claim 30 wherein a change in a LCH-ID value indicates an end of an enhanced MAC-es PDU.

34. The WTRU of claim 30 wherein enhanced MAC-es SDUs do not include segments of higher layer PDUs.

35. A Node B configured to communicate an Iub enhanced dedicated channel (E-DCH) data frame to a radio network controller (RNC), the Node B comprising:
the Node B configured to add to the Iub E-DCH data frame a number of enhanced MAC-es Protocol Data Units (PDUs), wherein the enhanced MAC-es PDUs include at least one of segmented or complete higher layer PDUs; and
the Node B configured to add to the Iub E-DCH data frame a descriptor field for each enhanced MAC-es PDU, wherein each descriptor field comprises K logical channel indicator (LCH-ID) fields for each corresponding enhanced MAC-es PDU of the one or more enhanced MAC-es PDUs, where K is the number of enhanced MAC-es SDUs concatenated in the corresponding enhanced MAC-es PDU.

36. The Node B of claim 35, wherein each the header descriptor field further comprises K length (L) fields and K finish (F) flags for each corresponding enhanced MAC-es PDU of the one or more enhanced MAC-es PDUs.

* * * * *